United States Patent
Nakamura et al.

(10) Patent No.: US 7,185,198 B2
(45) Date of Patent: Feb. 27, 2007

(54) APPARATUS AND METHOD FOR AUTHENTICATION AND METHOD FOR REGISTERING A PERSON

(75) Inventors: Akihiko Nakamura, Kyoto (JP); Keichi Nagayama, Kyoto (JP)

(73) Assignee: Omron Corporation, Kyoto (JP)

( * ) Notice: Subject to any disclaimer, the term of this patent is extended or adjusted under 35 U.S.C. 154(b) by 773 days.

(21) Appl. No.: 10/213,449

(22) Filed: Aug. 7, 2002

(65) Prior Publication Data

US 2003/0046540 A1  Mar. 6, 2003

(30) Foreign Application Priority Data

Aug. 8, 2001 (JP) ............................. 2001-240438

(51) Int. Cl.
*H04L 9/00* (2006.01)
(52) U.S. Cl. .................. 713/168; 713/184; 713/185; 713/186; 726/9; 726/20; 726/27; 307/10.5
(58) Field of Classification Search .................. 726/9, 726/20, 27–30, 25; 307/10.5; 713/186, 713/168, 184, 185
See application file for complete search history.

(56) References Cited

U.S. PATENT DOCUMENTS

| | | | | |
|---|---|---|---|---|
| 5,513,107 | A | * | 4/1996 | Gormley ....................... 701/48 |
| 5,526,428 | A | * | 6/1996 | Arnold ......................... 713/159 |
| 5,686,765 | A | * | 11/1997 | Washington ................ 307/10.5 |
| 5,874,785 | A | * | 2/1999 | Liu ............................. 307/10.5 |
| 6,140,939 | A | * | 10/2000 | Flick ....................... 340/825.69 |
| 6,219,793 | B1 | | 4/2001 | Li et al. |
| 6,252,978 | B1 | | 6/2001 | Grantz |
| 6,260,651 | B1 | * | 7/2001 | Kokubu et al. .............. 180/287 |
| 6,349,257 | B1 | * | 2/2002 | Liu et al. ..................... 701/200 |
| 6,380,643 | B1 | * | 4/2002 | Losey et al. ................ 307/10.5 |
| 6,480,643 | B1 | * | 11/2002 | Allman et al. ................. 385/14 |
| 6,684,335 | B1 | * | 1/2004 | Epstein et al. ................. 726/23 |
| 6,799,275 | B1 | * | 9/2004 | Bjorn .......................... 713/186 |
| 6,868,170 | B1 | * | 3/2005 | Fuku et al. ................... 382/124 |
| 6,889,168 | B2 | * | 5/2005 | Hartley et al. .............. 702/186 |
| 6,963,794 | B2 | * | 11/2005 | Geber et al. .................... 701/2 |

FOREIGN PATENT DOCUMENTS

| | | |
|---|---|---|
| DE | 199 17 885 C1 | 4/1999 |
| DE | 199 17 817 A1 | 10/2000 |
| EP | 1 006 028 A2 | 7/2000 |
| GB | 2 349 257 A | 10/2000 |

OTHER PUBLICATIONS

Wayman et al., "A Generalized Biometric Identification System Model," IEEE, 1998, pp. 291-295.

* cited by examiner

*Primary Examiner*—Kambiz Zand
*Assistant Examiner*—Tongoc Tran
(74) *Attorney, Agent, or Firm*—Foley & Lardner LLP

(57) ABSTRACT

Wrongful authentication process is prevented. A passive entry authenticating section compares an identification signal sent from a portable unit with an identification signal previously stored in a storage section. A biometrics authenticating section compares the biometrics information of a user inputted through a sensor section with the biometrics information registered in a biometrics database. A control section authenticates an authorized user when there is agreement in both the identification-signal comparison result and the biometrics-information comparison result, and controls a lock system to unlock the door lock of the automobile.

5 Claims, 13 Drawing Sheets

| PIN | BIOMETRICS DATA | | | |
|---|---|---|---|---|
| | FINGERPRINT 1 | FINGERPRINT 2 | FINGERPRINT 3 | FINGERPRINT 4 |
| 1234 | 10010010 | 10111001 | 11100111 | 10101010 |
| 2686 | 10000001 | 10100001 | 10100000 | 11011010 |
| ⋮ | ⋮ | ⋮ | ⋮ | ⋮ |

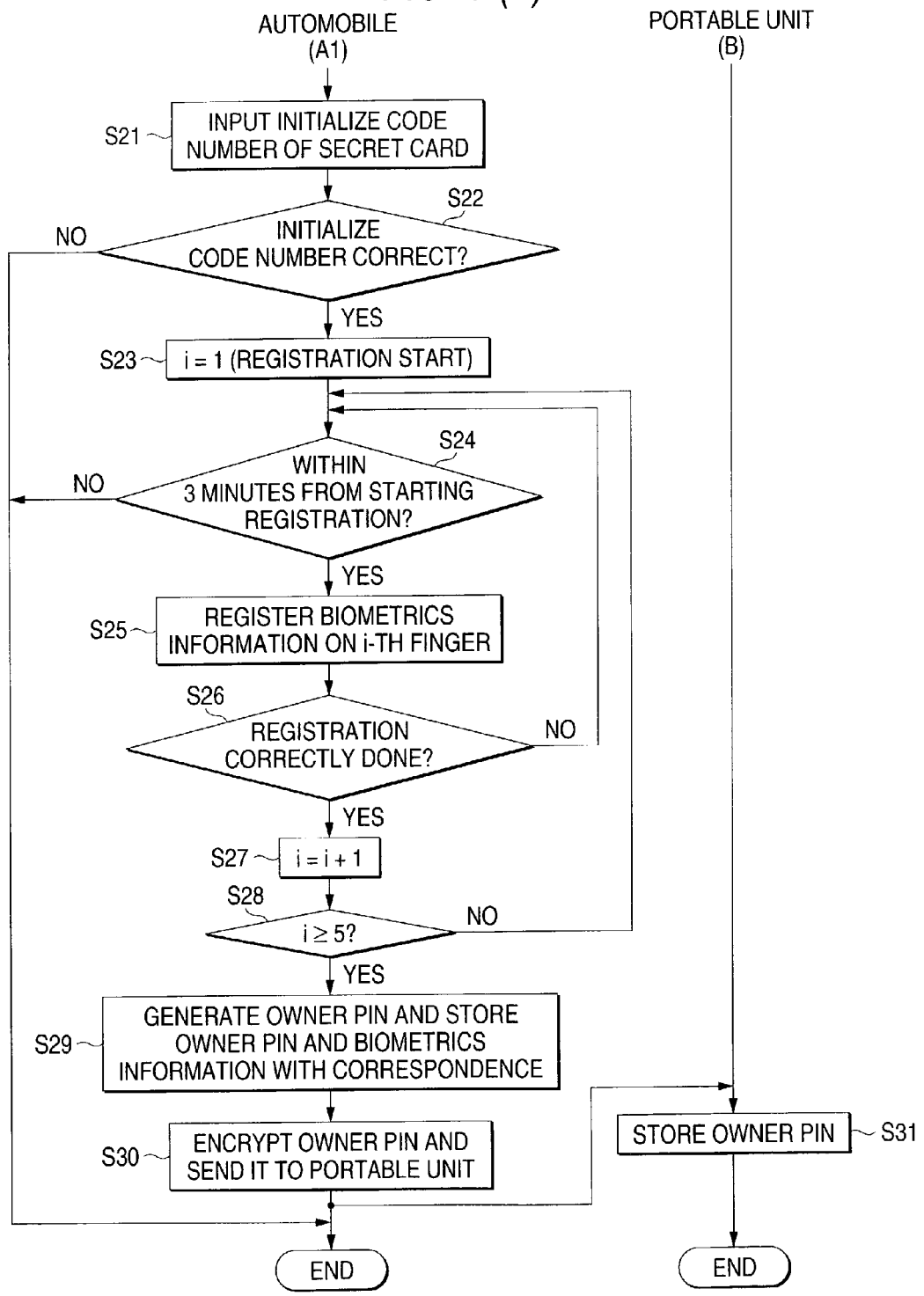

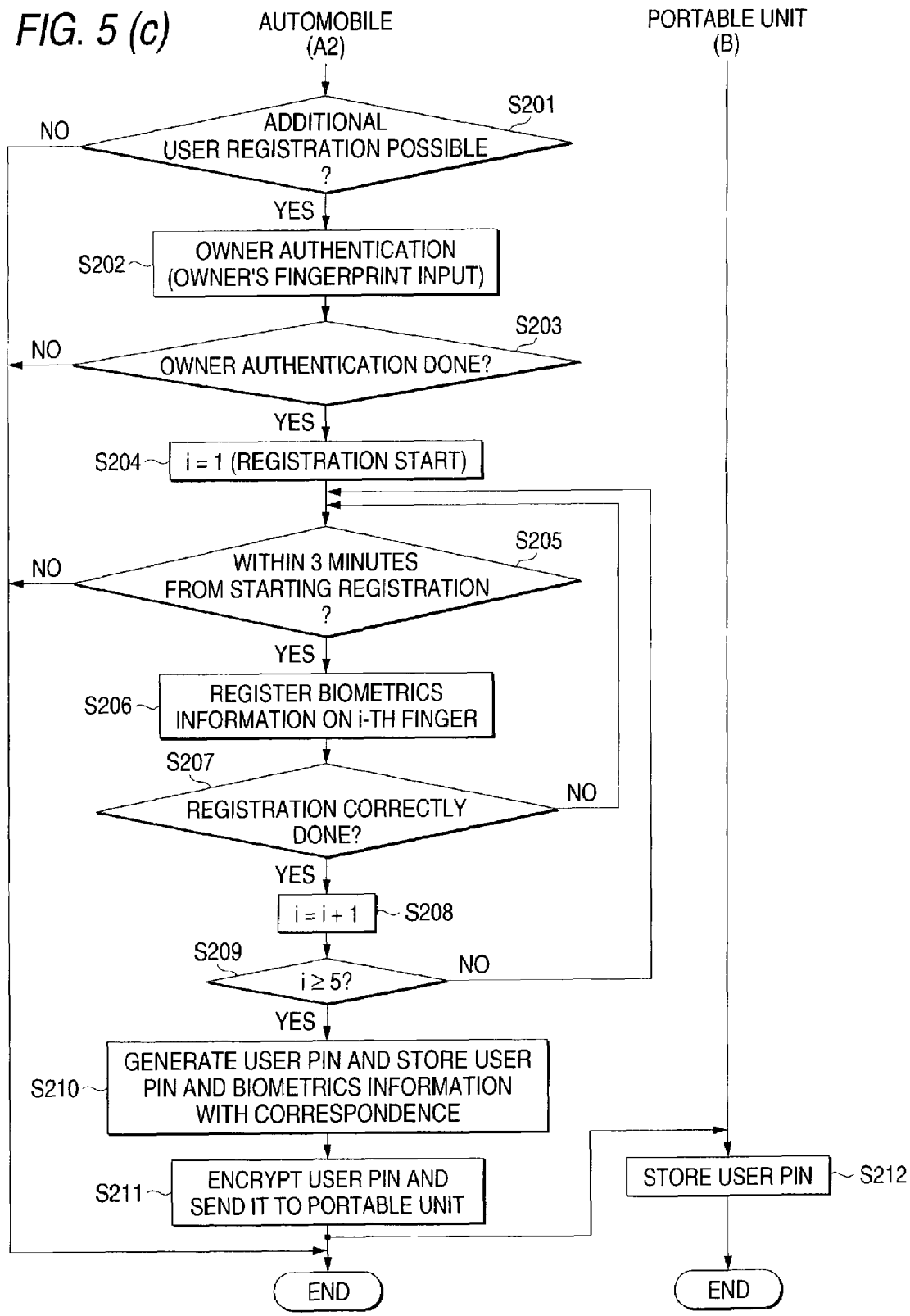

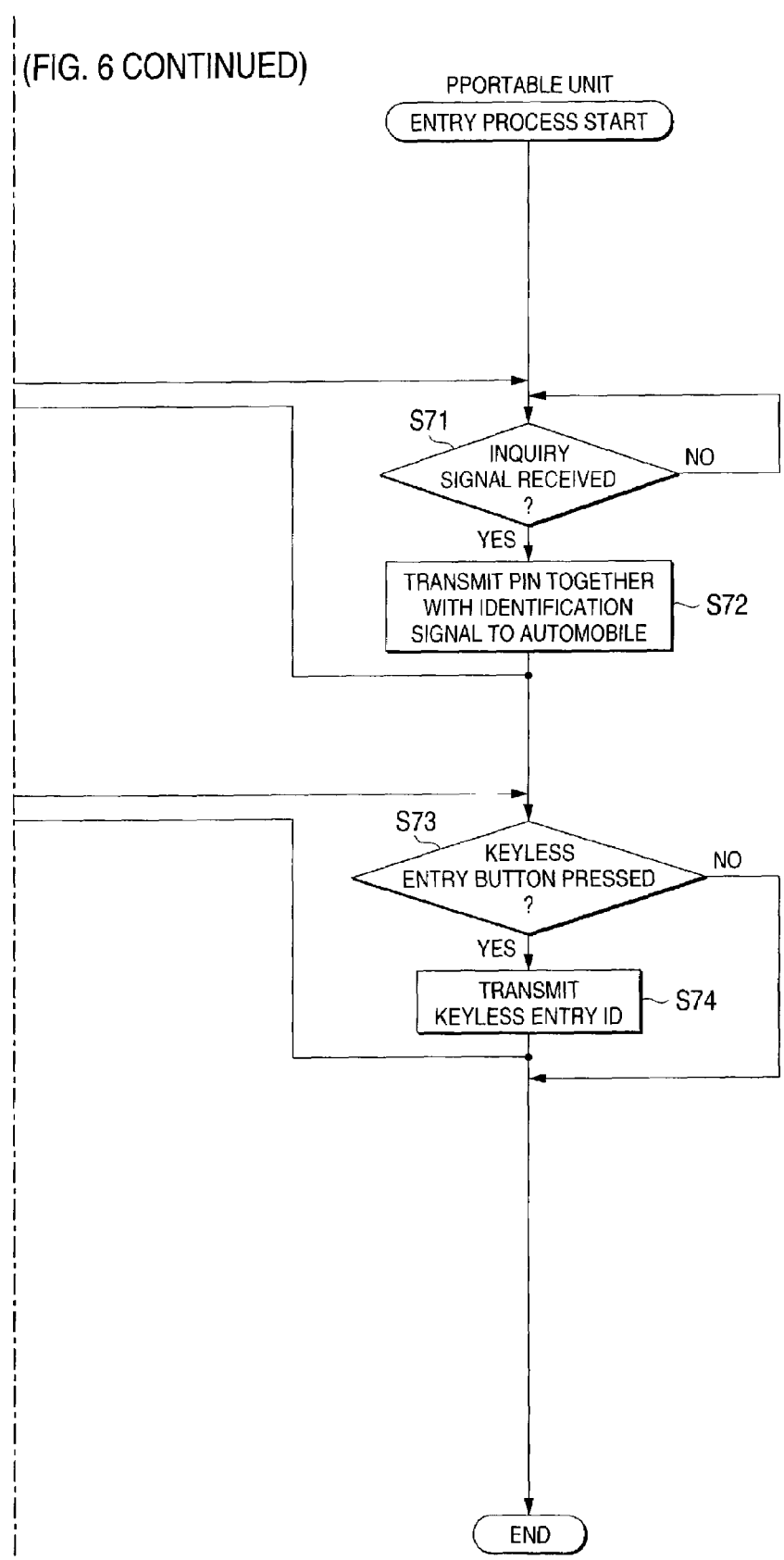

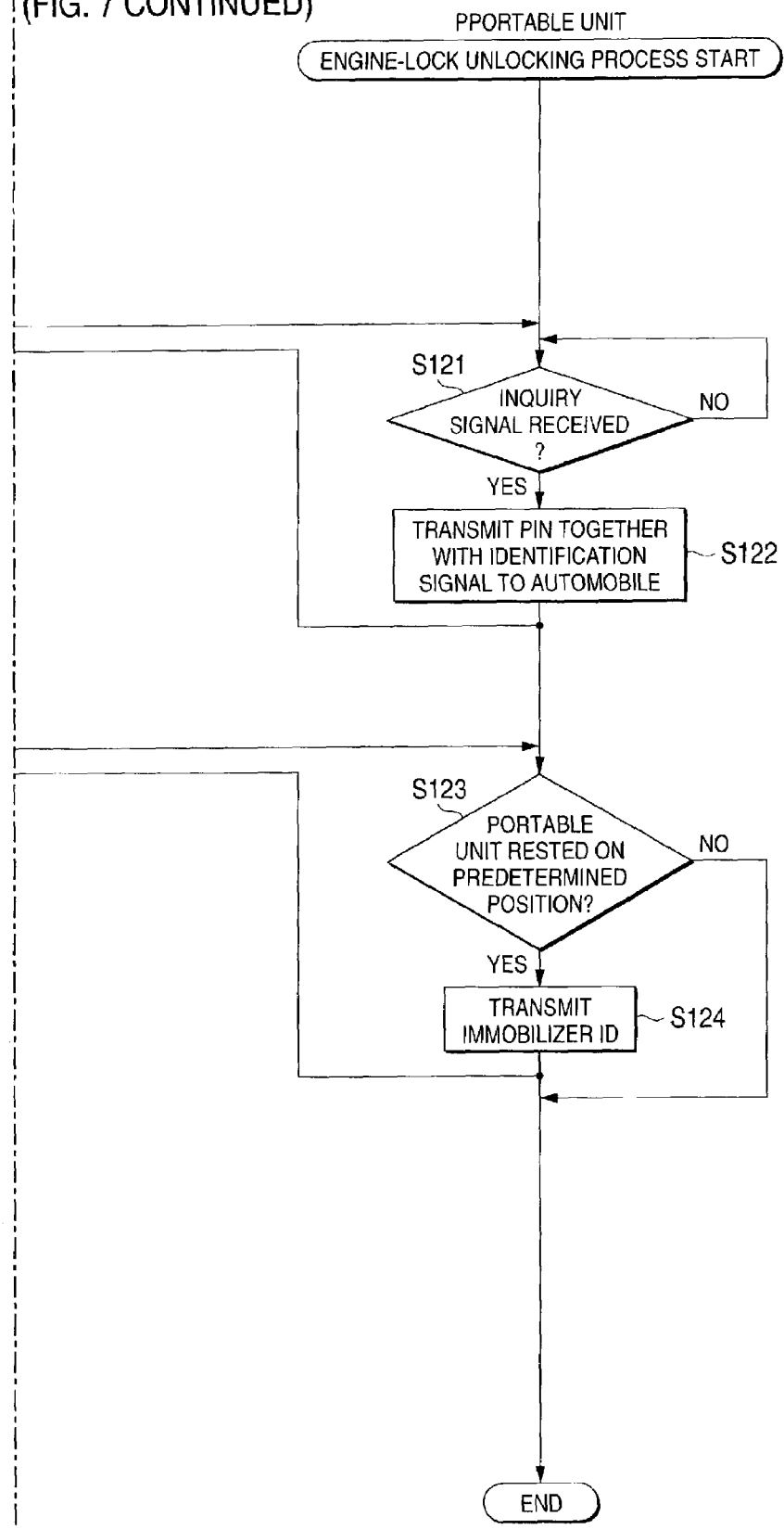

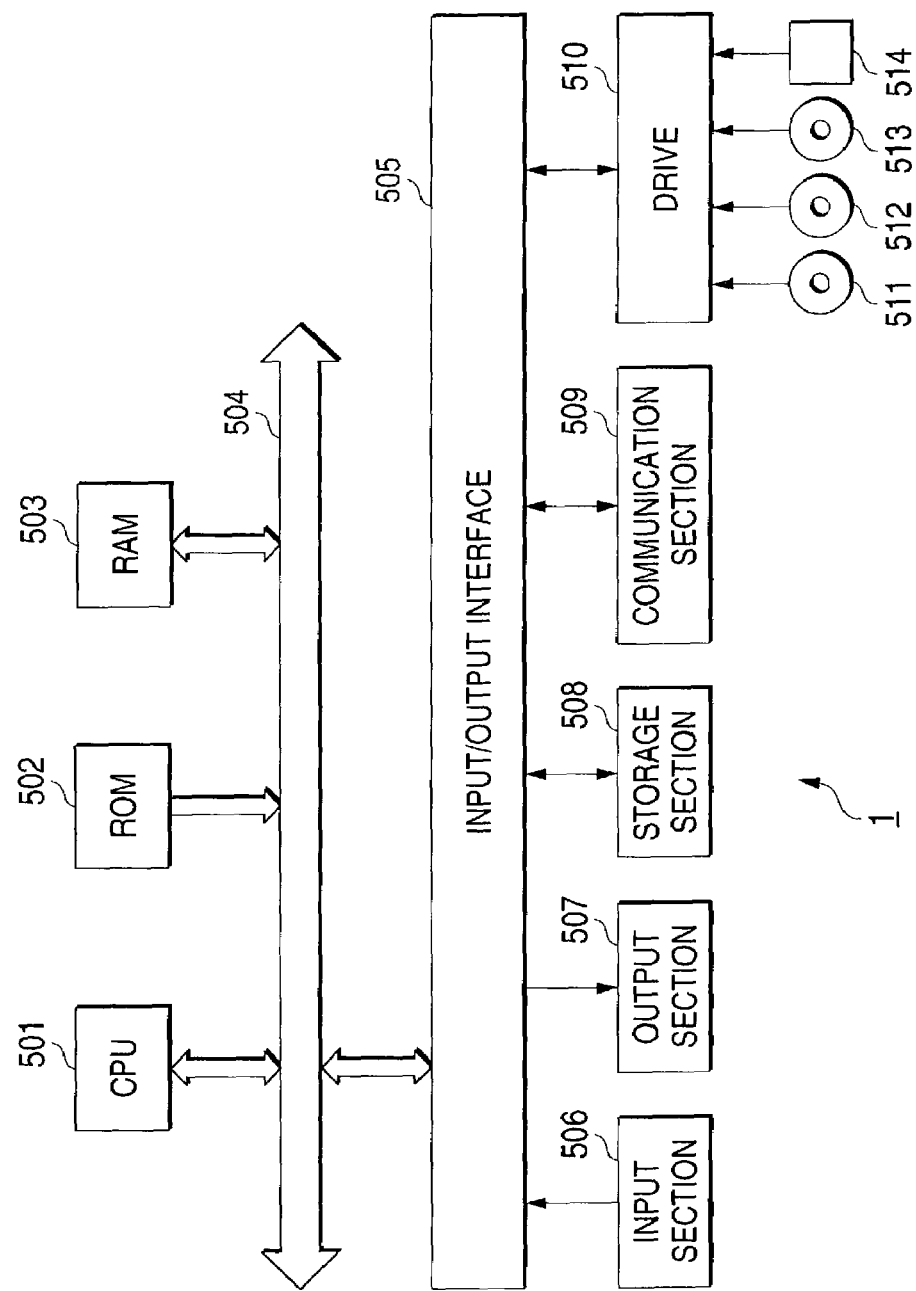

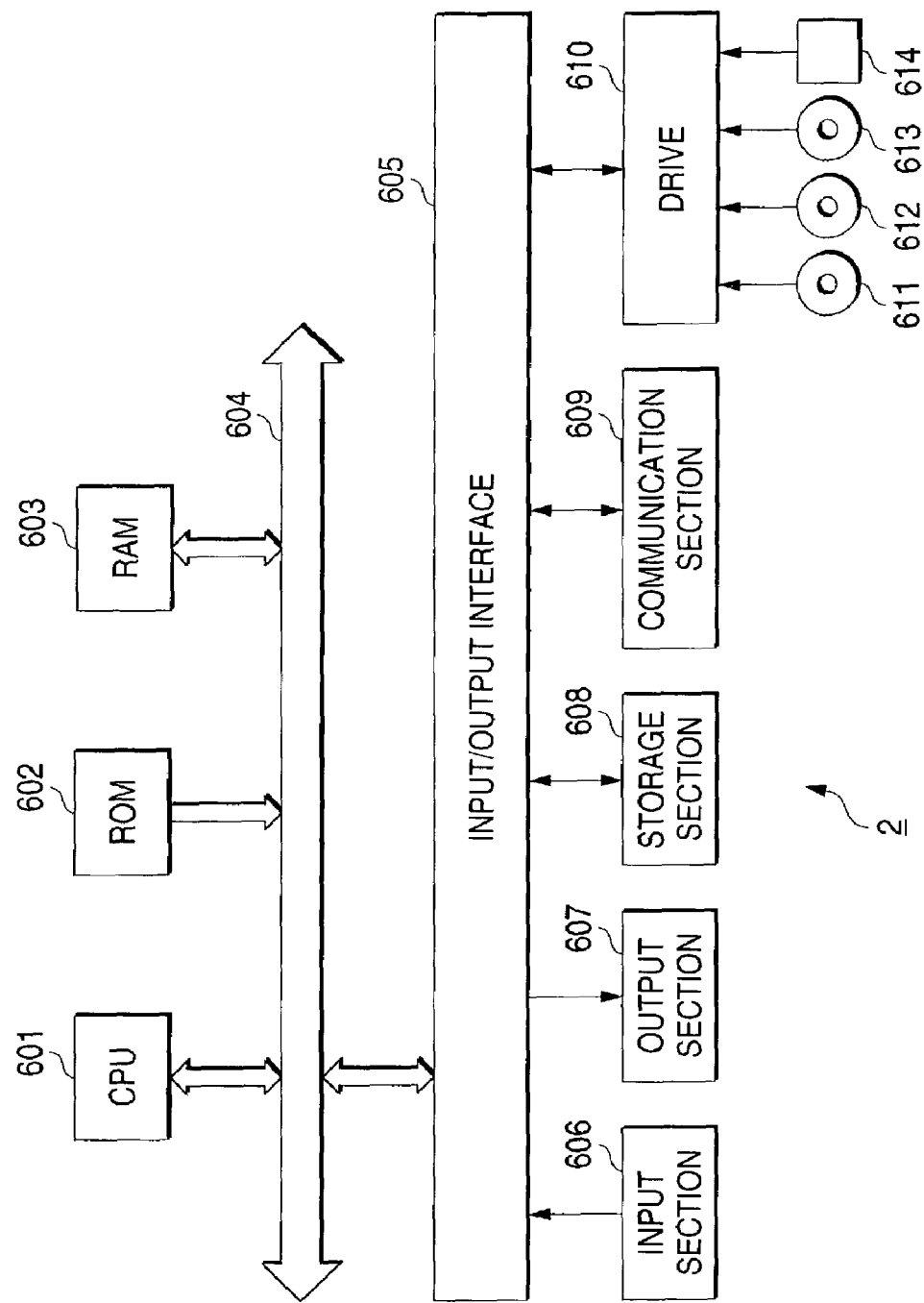

APPARATUS AND METHOD FOR AUTHENTICATION AND METHOD FOR REGISTERING A PERSON

CROSS-REFERENCE TO RELATED PATENT APPLICATIONS

This application claims the benefit of and priority to Japanese Patent Application No. 240438/2001, filed Aug. 8, 2001, which is incorporated by reference herein in its entirety.

BACKGROUND OF THE INVENTION

1. Field of the Invention

The present invention relates to an apparatus and method for authentication having means to prevent against wrongful authenticating process, and to a method for registering a person to an authenticating apparatus or appliance using such an authenticating method.

2. Description of the Related Art

There is generally, as a scheme for use in the door lock of an automobile, a widespread of a door lock scheme called, what is called, a smart entry scheme, wherein a user carries a portable unit in a key-folder form to cause unlocking according to an identification signal issued from the portable unit when the user comes nearby the automobile.

FIG. 1 is a diagram explaining a lock system of a conventional smart entry scheme. An automobile 1 has a control section 11 which is, what is called, a microcomputer configured with a CPU (Central Processing Unit), a RAM (Random Access Memory) and a ROM (Read Only Memory). The CPU expands the program stored in the ROM onto the RAM and executes it to control the overall operation of the automobile 1. Note that FIG. 1 shows only a configuration for mainly controlling the automobile 1, omitting the showing, for example, of a drive system and the like.

A lock system 12, under control of the control section 11, manages to unlock and lock the door lock of the automobile. A passive entry authenticating section 13 transmits an inquiry signal to a portable unit 2 through a communicating section 15, and compares between the corresponding identification signal 33a from the portable unit 2 and the identification signal 14a previously stored in a storage section 14 to output a comparison result to the control section 11.

The control section 31 of the portable unit 2 is, what is called, a microcomputer configured with a CPU, a ROM and a RAM, so that the CPU expands the program stored in the ROM onto the RAM and executes it thereby controlling the overall operation of the portable unit 2. The control section 31 controls the communicating section 32 to transmit an identification signal 33a previously stored in a memory 33 correspondingly to an inquiry signal sent from the automobile 1.

Next, explanation will be made on the operation of the smart entry system of FIG. 1.

The control section 11 controls the communicating section 15 to detect the portable unit 2 when approaching to within a distance, and controls the passive entry authenticating section 13 to transmit an inquiry signal through the communicating section 15 to the portable unit 2. The control section 31 of the portable unit 2, receiving the inquiry signal from the automobile 1 through a communicating section 32, reads out an identification signal 33a previously stored in the memory 33 and transmits it to the automobile 1 by controlling the communicating section 32.

The control section 11 of the automobile 1, when recognizing a reception of the identification signal 33a through the communicating section 15, causes it to output the same to the passive entry authenticating section 13. The passive entry authenticating section 13 compares between the identification signal 33a transmitted from the portable unit 12 and the identification signal 14a previously stored in the storage section 14, to output a comparison result to the control section 11. For example, in the case of an agreement in the comparison result, the user carrying the portable unit 12 is considered as an authorized user of the automobile 1. Thus, the lock system 12 is controlled for unlocking. Meanwhile, in the case of a disagreement in the comparison result, the user carrying the portable unit 12 is considered as not an authorized user of the automobile 1 so that the locked state is maintained without operating the lock system 12.

Thus, according to the smart entry system, the authorized user carrying the portable unit 12, if near to within a constant distance of the automobile 1, is allowed to unlock without being conscious of an unlocking operation of the door lock. The locked state can be maintained against an unauthorized user.

In the smart entry system, however, there is a fear of unlocking by an unauthorized user who is not the owner of the automobile 1 by stealing an inquiry signal and identification signal of the automobile 1 and portable unit 2 according a method called relay team attack.

Relay team attack is carried out by two unauthorized users A, B in combination respectively carrying repeaters 51, 52, wherein one of them approaches the automobile 1 while the other is nearby an authorized user as shown in FIG. 2. The repeaters 51, 52 respectively have communicating sections 72, 82 to be controlled by control sections 71, 81, to wrongfully transmit and receive inquiry and identification signals when operating sections 73, 83 are operated.

Namely, the unauthorized user A carrying the repeater 51 goes near (to a close distance to) the automobile 1 whereby the passive entry authenticating section 13 of the automobile 1 transmits an inquiry signal through the communicating section 15. The repeater 51 relays the inquiry signal to transmit it to the repeater 52 carried by the unauthorized user B who is nearby (in a close distance to) the authorized user distant (distant by nearly a middle or long distance greater than a distance at which the usual automobile 1 can detect the portable unit 2) from the automobile 1.

The repeater 52 relays the inquiry signal transmitted from the repeater 51 to transmit it onto the portable unit 2. Thereupon, the portable unit 2 transmits an identification signal 33a as if approaching the automobile 1. The repeater 52 relays the identification signal 33a and transmits it to the repeater 51. The repeater 51 repeats the identification signal 33a transmitted from the repeater 52 to send it onto the automobile 1.

The passive entry authenticating section 13 of the automobile 1 compares between the identification signal 33a relayed from the repeater 51 and the identification signal 14a previously stored in the storage section 14, to output a comparison result to the control section 11. At this time, because the identification signal 33a is the one transmitted from the portable unit 2 possessed by the authorized user, the comparison result results in agreement.

Consequently, despite the one who is approaching the automobile 1 is the unauthorized user A while the authorized user is distant from the automobile 1, the control section 11 controls the lock system to unlock the lock of the automobile 1.

As a result, the unauthorized users A, B can unlock the lock of the automobile 1 without the authorized user being aware, by respectively carrying the repeater 51, 52 to approach the automobile 1 and authorized user.

In this manner, there has been a problem that a wrongful authentication process is carried out by the relay team attack method to illegitimately unlock the door lock of an automobile.

The present invention has been made in view of such a circumstance, which makes it possible to prevent against the wrongful use of a smart entry system.

SUMMARY OF THE INVENTION

An apparatus and method of authentication of the present invention authenticates as to whether there is an agreement between the identification signal of a portable unit transmitted from the portable unit (e.g. remote-control transmitter in a keyless entry system of an automobile) and the identification signal stored in an authenticating apparatus main body (to be considered in a form, e.g., incorporated in an automobile). On the other hand, inputted biometrics information (fingerprint, facial image, voiceprint, retina pattern or physiognomy) is compared with previously stored biometrics information, to carry out personal authentication as well. Two authentication results, if each in agreement, are rendered a final authentication.

Due to this, double checking is made with the authentication due to portable-unit identification and the authentication due to biometrics information, thus positively preventing a wrongful authentication process.

Meanwhile, in a preferred embodiment, when storing biometrics information, it is stored with correspondence to a personal authenticating number. When transmitting an identification number from the portable unit, a personal identification number incorporated in the portable unit is also transmitted simultaneously. In a personal authentication, the biometrics information corresponding to the received personal identification number is invoked and compared with the input biometrics information.

Explanation will be further made on an effect of the present embodiment in the case that an authenticating apparatus having a personal authenticating function is mounted on an automobile. The automobile at its inside is often at high temperature. In order to normally operate the authenticating apparatus mounted on the automobile, there is a need for an operation processing unit (CPU) incorporated in the authenticating apparatus to have a constant heat resistance. However, the CPU having a constant heat resistance is not so high in processing speed. Due to the experiment by the present inventors, as one example, a result was obtained that it takes 1.5 seconds in one collating process of between one of inputted fingerprint data and one of previously stored fingerprint data. Furthermore, if considering a case that the fingerprint data on four fingers is stored as the data on one person and compared with one of inputted fingerprint data thereby carrying out an authenticating process, the mere collation/authentication with the data on one person takes 4 times 1.5 seconds, i.e. 6 seconds, in calculation.

Accordingly, it is of importance, in an authenticating process in a site requiring heat resistance for the authenticating apparatus, particularly an automobile, to make a certain selection from among previously stored biometrics information thereby carrying out a personal authentication process. The present embodiment is practical freely from a prolonged authenticating process, because of selection due to a received personal identification number.

In a further preferred embodiment, a personal identification number is class if classified with first and second kinds. A first-kind personal identification number is to identify an owner of an automobile incorporating, for example, an identifying device. A second-kind personal identification number is to identify a user of other than the owner who drives the automobile. On that basis, in order to register a person (user other than the owner) identified by the second-kind personal identification number, there is a need that the person identified by the first-kind personal identification number has been previously registered and the biometrics information on that person has been authenticated.

Due to this, the person to be identified by the first-kind personal identification number can prevent against a user registration the same person is not concerned with, thus further enhancing the effect to prevent against wrongful authenticating processes.

In a further preferred embodiment, when a person identified by a first-kind personal identification number has been newly registered, deleted are all the already stored second-kind personal identification numbers and the corresponding biometrics information.

Due to this, when a person to be identified by the first-kind personal identification number, e.g. the owner of the automobile incorporating the identifying apparatus, is changed and newly registered, the user the former automobile owner has permitted user registration is not allowed to drive the automobile. Thus, the automobile can be prevented from being wrongfully stolen.

BRIEF DESCRIPTION OF THE DRAWINGS

FIG. 8 is a diagram explaining an example having a control section of an automobile configured by a personal computer; and FIG. 9 is a diagram explaining an example having a portable unit configured by a personal computer.

DETAILED DESCRIPTION OF THE PREFERRED EMBODIMENTS

Figure 3:
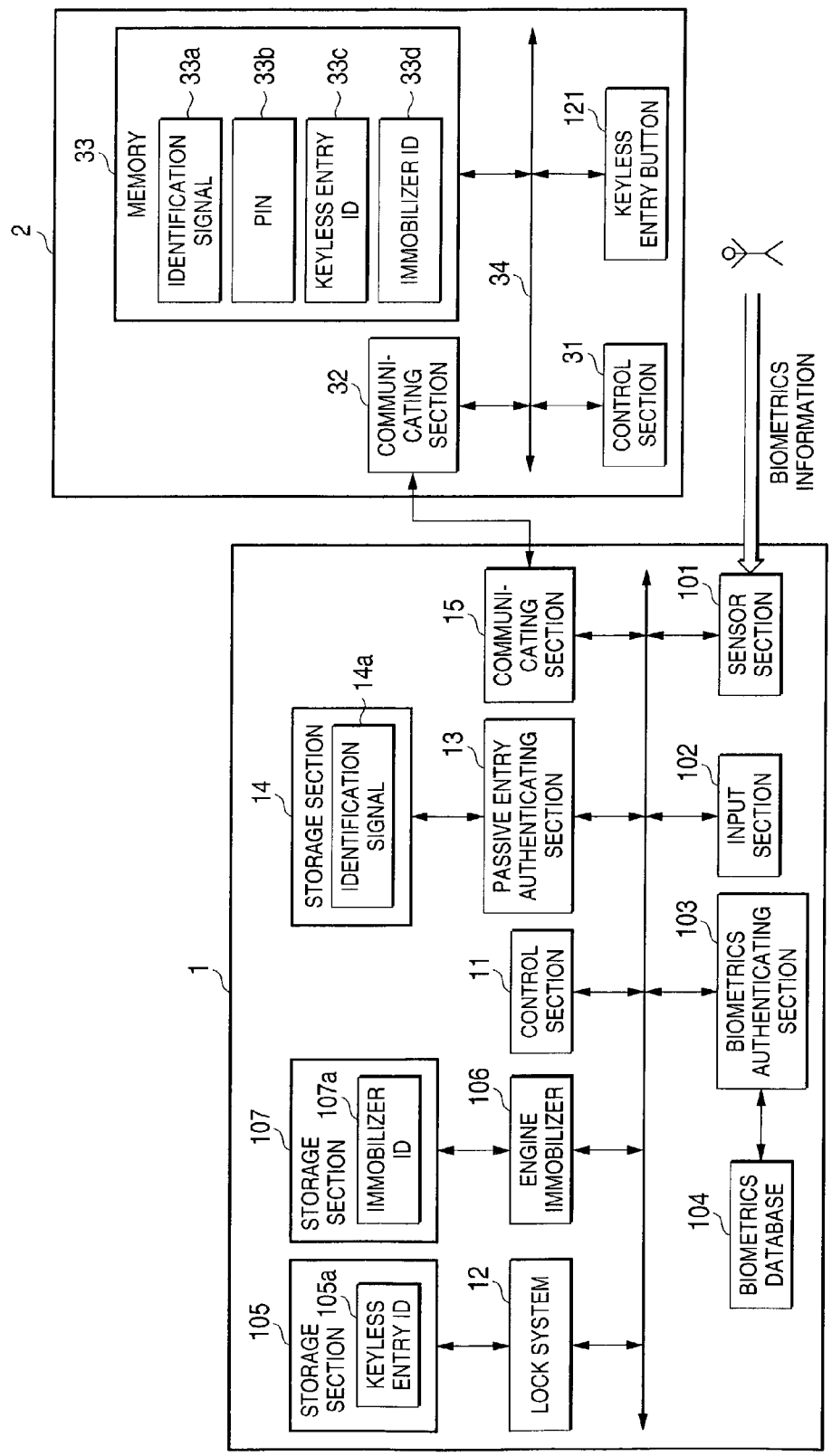
FIG. 3a is a diagram showing a smart entry system to which the present invention is applied.
FIG. 3b is a diagram showing an input section to which the present invention is applied.

FIG. 3 is a diagram showing an embodiment configuration of a smart entry system according to the present invention. Note that, in FIG. 3 and the subsequent, the elements corresponding to those in the figures on the related art are attached with the same references to conveniently omit the explanations thereof. Meanwhile, in this embodiment, biometrics information refers to fingerprints.

Figure 1:
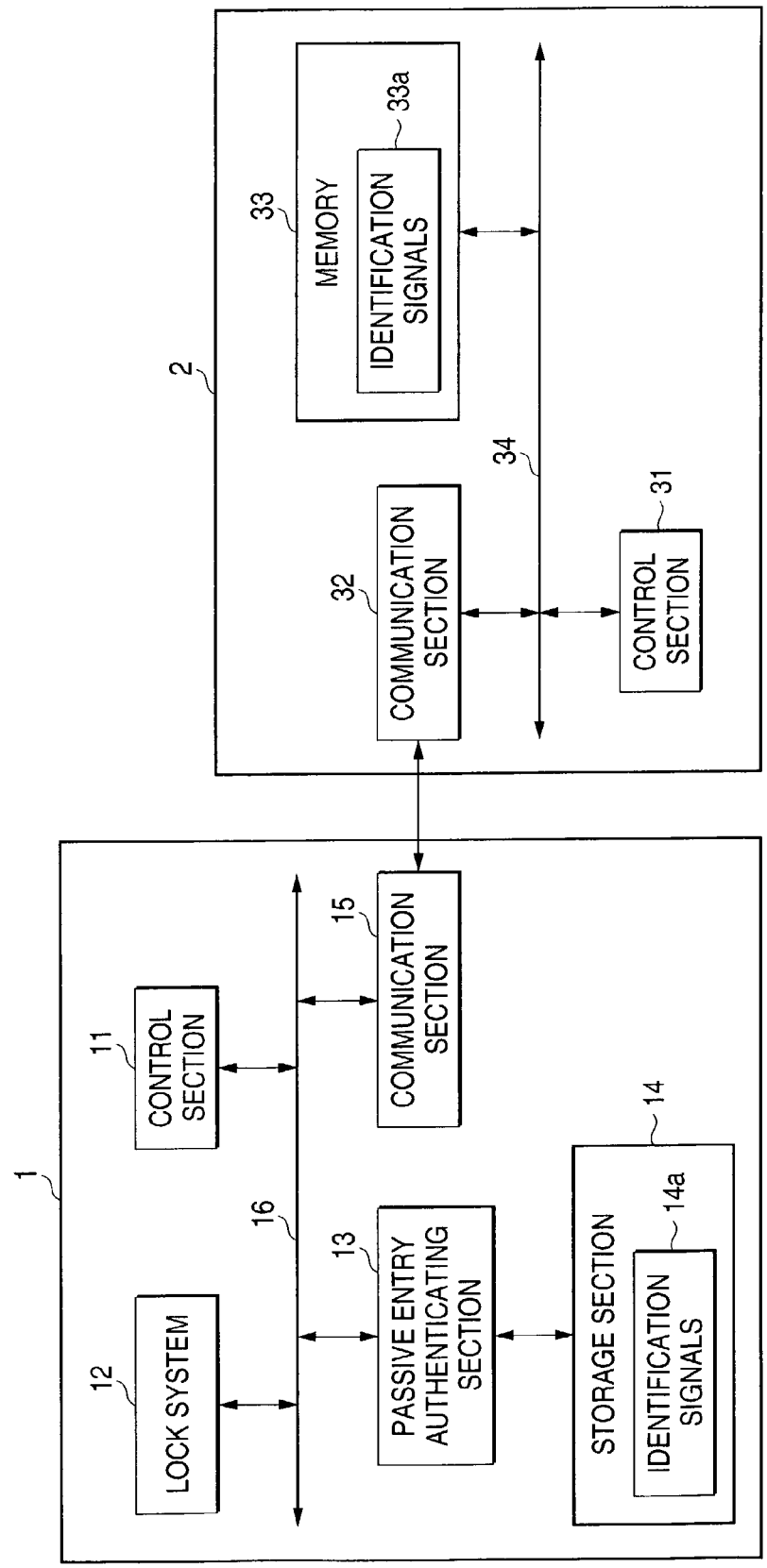
FIG. 1 is a diagram showing a configuration of a conventional smart entry system.
Figure 2:
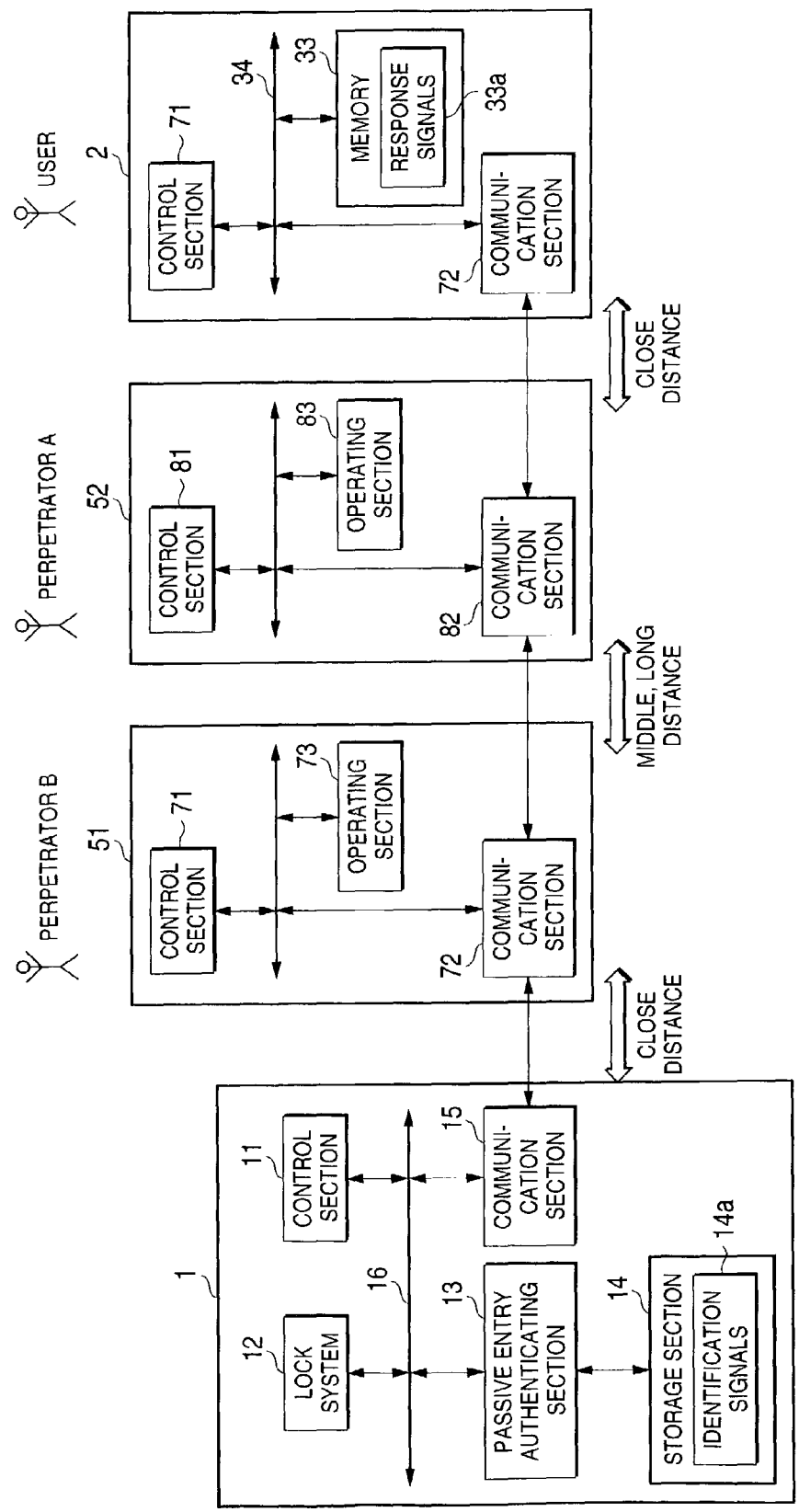
FIG. 2 is a diagram showing a configuration of an embodiment of a semiconductor device to which the present invention is applied.

In the configuration of an automobile 1 of FIG. 3, the configuration of the present embodiment is different from that of the related art automobile of FIG. 1 lies in that there are provided a sensor section 101, an input section 102, a biometrics authenticating section 103, a biometrics database 104, a storage section 105, an engine immobilizer 106 and a storage section 107. Also, a control section 11 incorporates therein a timer (not shown). In the control with time measurement, the timer is operated to assist the control.

A sensor section 101 is under control of the control section 11. When instructed for operation, this requests a user to input biometrics information through a speaker (not shown) or the like. In a case where biometrics information of an authorized user is inputted, the information is converted into digital information and outputted to the biometrics authenticating section 103. Because the biometrics information herein is a fingerprint, the sensor section 101 uses a fingerprint input device incorporating a CCD (Charge Coupled Device) or the like. In this case, the sensor section 101 can be set up at the outside of the vehicle. However, the provision on a compartment dashboard in front of the driver's seat is also envisioned, which will provide convenience in use.

An input section 102 is operated when the user is to carry out a predetermined process. This outputs a signal in accordance with an operation to the control section 11. This may be concretely configured with tablet buttons, a keyboard or the like, but can be configured, for example, with a mode change switch 102a, ten keys 102b and a card reader 102c as shown in FIG. 3B.

The mode change switch 102a is to switch between an authentication mode to authenticate a user and lock or unlock a lock system 12, and a registration mode to register biometrics information, such as fingerprints. The ten keys 102b are to input numerals, such as numbers. The card reader 102c is to receive a secret card required for initially registering a vehicular owner and read in-card data. The secret card is printed, on a surface, with an initialize code number for owner's initial registration. This is recorded also as magnetic data. However, there exist secret cards having only one of printing and data recording.

Incidentally, the input section 102 may be provided anywhere within the vehicle. However, it will be convenient in use to provide it, side by side, with the sensor section 101 on the compartment dashboard in front of the driver's seat.

Figures 3, 4:
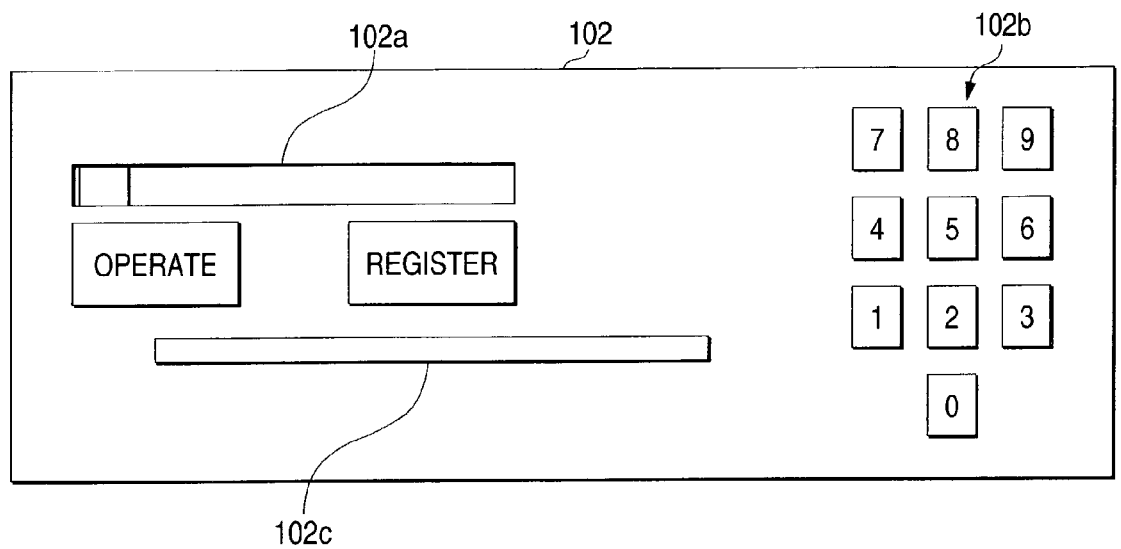
FIG. 4 is a figure showing a relationship between a PIN and biometrics information.

The biometrics authenticating section 103 stores (to the biometrics database 104) the biometrics information of an authorized user inputted to the sensor section 101 upon registration. When authenticating the user, this biometrics information is compared with the biometrics information inputted through the sensor section 101. A result of comparison is outputted to the control section 11. Meanwhile, the biometrics authenticating section 103, upon registering biometrics information, sets and registers a PIN (Personal Identifier Number: identification number of biometrics information) as corresponding digital information, and further encrypts this PIN and sends it through a communicating section 15 to a portable unit 2 possessed by each authorized user. This encrypted PIN is stored with correspondence to the biometrics information, as shown in FIG. 4.

There are various forms of storing the PIN and biometrics information with correspondence. Because the biometrics information in this embodiment is a fingerprint, storage is made with correspondence between one PIN and the biometrics information on four fingers, as shown in FIG. 4. This is because of a preparation for a case that one to two fingers are dirty or wounded and not suitable for fingerprint recognition. However, it is of course possible to store one PIN with correspondence to 1–3 or 5 or more pieces of biometrics information.

Meanwhile, the PIN of a vehicular owner (owner PIN) is assumably distinguished from the PINs of the other users (user PIN). The vehicular owner possesses a strong authority, e.g. the other user who is to register requires a permission (authentication) of the owner.

Many approaches can be considered for the distinguishment between the owner PIN and the user PIN. There is included an approach, as one example, that four figures are provided to the PIN so that, for the owner PIN, 1 is given to the first-order figure and, for the user PIN, 2 is given to the first-order figure. Note that, in each PIN, the lower three figures are generated by the use of random numbers or the like.

During authentication, when an encrypted PIN is transmitted together with biometrics information from the portable unit 2, the biometrics authenticating section 103 compares between the biometrics information corresponding to the PIN and the biometrics information inputted to the sensor section 101. By this process, the biometrics authenticating section 103 can avoid from a comparison process between the inputted biometrics information and a plurality of pieces of biometrics information previously stored in the biometrics database 104. Because it is satisfactory to execute only the comparison process necessitated in authentication, authentication process rate can be increased.

The storage section 105 is stored with keyless entry IDs 105a previously registered based on each portable unit 2. The keyless entry ID 105a is used in pushing to release door lock of an automobile 1 by a user not registered with biometrics information but borrowed a portable unit 2 from an authorized user. The lock system 12 compares a keyless entry ID 33c transmitted upon pushing the keyless entry button 121 on the portable unit 2 with the previously registered keyless entry ID 105a. When the both are in agreement, the control section 11 controls the lock system 12 to release the door lock.

The engine immobilizer 106 compares an immobilizer ID 33d previously stored in a memory 33 transmitted by the portable unit 2 with an immobilizer ID 107a stored in the storage section 107, to control engine-ignition on/off (engine lock) depending on agreement or not. When the engine immobilizer 106 controls the engine to on, in case an operation is made to start up the engine of the automobile 1, control is made to electrically start up the engine. When controlled off, the engine is controlled into a state not to be electrically started up. Consequently, should an unauthorized user could have wrongfully operated the lock system 12 and intruded into the automobile 1, the engine cannot be started up unless the engine immobilizer 106 is operated on (releasing the engine lock).

Now, the portable unit 2 will be explained.

Comparing with the portable unit 2 of FIG. 1, the portable unit 2 of the present invention as applied is previously stored with a PIN 33b, an immobilizer ID 33d and a keyless entry ID 33c in the memory 33. Furthermore, a keyless entry button 121 is provided.

In case biometrics information is registered in the automobile 1 as mentioned above, a PIN 33b is received in an encrypted state and stored to the memory 33. It is assumed herein that an owner PIN on one person and a user PIN on one person can be inputted to and stored in one portable unit. It is defined that there is one owner for one vehicle to allow for storage of an owner PIN on one person only. However, specification may be made such that, concerning the user PIN, the storage capacity of the memory 33 is increased to store a user PIN on two or more persons.

The keyless entry ID 33c and immobilizer ID 33d is stored during manufacture, together with the keyless entry ID 105a stored in the storage section 105 of the automobile 1 and the immobilizer ID 107a stored in the storage section 107. Note that the immobilizer ID 33d, the keyless ID 33c, the keyless entry ID 105a and the immobilizer ID 107a may be provided changeable in setting as required.

Explanation will now be made on a biometrics information registering process with reference to a flowchart of FIGS. 5A to 5C.

In step S1 of FIG. 5A, the control section 11 of the automobile 1 determines whether the mode change switch 102a is in a registration mode or not. If in a registration mode, the process proceeds to step S2. If not, this determination is repeated at a constant time interval.

In step S2, the control section 11 controls the passive entry authenticating section 13 and communicating section 15 to transmit a registration inquiry signal to the portable unit 2.

In step S11, the control section 31 of the portable unit 2 controls the communicating section 32 to determine whether a registering inquiry signal has been received or not. If it has been received, the process proceeds to step S22. If it has not been received, this determination is repeated at a constant time interval.

In step S12, the control section 31 controls the communicating section 32 to transmit an identification signal 33a of the portable unit to the automobile 1.

In step S3, the control section 11 controls the communicating section 15 to determine whether an identification signal of the portable unit has been received or not. If it has been received, then the passive entry authenticating section 13 is controlled to determine whether the received portable-unit identification signal 33a agrees with the identification signal 14a previously stored in the storage section 14 or not. If in agreement, the process proceeds to step S4. Unless, in step S2, if a signal in agreement with the identification signal 14a is received within a predetermined time from the transmission of an inquiry signal, the process is ended.

In step S4, the control section 11 makes reference to the biometrics database 104 to confirm whether automobile owner data has already been registered or not. If already registered, the process proceeds to step S5, while if not registered, the process jumps to (A1).

In step S5, inputting is prompted whether to make an owner registration or a user registration. Specifically, an instruction is issued to press "1" of the ten key 102b for owner registration and to press "2" for user registration through a not-shown speaker.

In step S6, it is determined whether or not ten key "1" has been pressed within a constant time from issuing the instruction. When "1" has been pressed, the process jumps to (A1). When not pressed, the process proceeds to step S7.

In step S7, it is determined whether or not ten key "2" has been pressed within a constant time from issuing the instruction. When "2" has been pressed, the process proceeds to (A2). If not, the process is ended.

FIG. 5(b) is a flowchart in making an owner registration.

In step S21, an initialize code number of a secret card is inputted. Inputting may be by inserting the secret card in a card reader 102c in order for reading. Otherwise, the initialize code number written on a surface of the secret card may be inputted by the ten key 102b.

In step S22, determination is made whether the inputted initialize cord number is correct or not. Specifically, reference is made to an initialize cord number recording section (not shown), within the automobile, to collate it with the input number by the control section 11. If the both numbers are in agreement, the process proceeds to step S23. If they are not in agreement, the process is ended.

In step S23, i is rendered as an initial value 1. In step S24, confirmation is made whether 3 minutes has elapsed from a start of registration. When 3 minutes has elapsed, the process is ended. If 3 minutes has not yet elapsed, the process proceeds to step S25. Note that 3 minutes are a value to give a limitation to a time required in registering four fingers of biometrics information (fingerprints). The value may be properly designated without limit to 3 minutes.

In step S25, registration is made on the i-th finger of biometrics information. Because the initial value is i=1, registration is started at the first finger. The detailed operation of registration is to put a fingerprint of the finger onto the sensor section 101 and then read it out. Note that at which finger registration is to start is at registering owner's will.

In step S26, confirmation is made whether biometrics information has been normally read or not. If normally read, the process proceeds to step S27. If not, the process returns to the step S25 where reading is made again.

In step S27, the value i is incremented by 1. If in a state that biometrics information registration is ended on the first finger (i=1), i is incremented by 1 to 2. Next, biometrics information registration will be made on the second finger. Considering similarly, if the biometrics registration has ended on four fingers (i=4), i=5 is given in this step S27.

In step S28, determination is made whether or not i is 5 or greater. If biometrics information registration on four fingers has completed to render i=5, the process proceeds to step S29. If not, it is represented that registration of four fingers has not yet completed, and then the process returns to step S24.

In step S29, an owner PIN is generated to store the owner PIN and biometrics information on four fingers into the biometrics database 104.

In step S30, the owner PIN is encrypted and then sent to the portable unit. Then, in step S31, the portable unit receives the encrypted owner PIN and stores it in the memory 33.

Incidentally, in case an owner registration is newly made to generate a new owner PIN, the other user registration contents (set of user PIN and fingerprint data) are all deleted.

FIG. 5C is a flowchart upon user registration.

In step S201, the biometrics database 104 is examined to confirm whether an additional user registration is possible for the portable unit 2 or not. This embodiment can register a user PIN on one person with the portable unit 2. However, in case a one-person user PIN has been registered, additional registration cannot be done.

If in a state an additional user registration is possible, the process proceeds to step S202. If not, the process is ended. Incidentally, when the process is ended herein, a notice can be given to the operator, e.g. by issuing a speech through a not-shown speaker "user registration is no longer possible. Delete the existing user registrations and then register."

In step S202, an owner authentication is made for user registration. Owner authentication is to certify that a user's new registration is consented with the owner. In the detailed procedure, the owner's finger is put on the sensor section 101 to allow a user registration in case the input fingerprint is recognized as the one of an owner previously registered in the biometrics database 104.

In step S203, confirmation is made whether owner authentication could have been made or not. If it could have been authenticated, the process moves to step S204. If not, the process is ended.

The steps S204 to S209 are similar to the steps S23 to S28 in the owner registration procedure of FIG. 5B. The user's four fingers of biometrics information are sequentially registered. When the four fingers have been registered, the process can proceed to step S210.

In step 210, a user PIN is generated to store the user PIN and biometrics information of four fingers to the biometrics database 104.

In step S211, the user PIN is encrypted and then sent to the portable unit. Then, in step S212, the portable unit receives the encrypted user PIN and stores it in the memory 33.

Incidentally, it is possible to separately define a procedure to delete the existing user registrations (set of user PIN and biometrics information of four fingers). In one example, in a state the mode change switch 102a is in a registration mode, "0" of the ten key 102b is pressed twice. Next, owner authentication is made in the procedure similar to the steps S202 and S203. If authentication can be made, then "9" of the ten key 102b is pressed twice. By the procedure as in this example, user registration can be assumably deleted on a condition of an owner authentication similarly to that of user registration.

By the above procedure, biometrics information is registered together with PINs to the biometrics database 104 of the automobile 1. Furthermore, the PIN is encrypted and stored in the portable unit 2.

Figure 5:
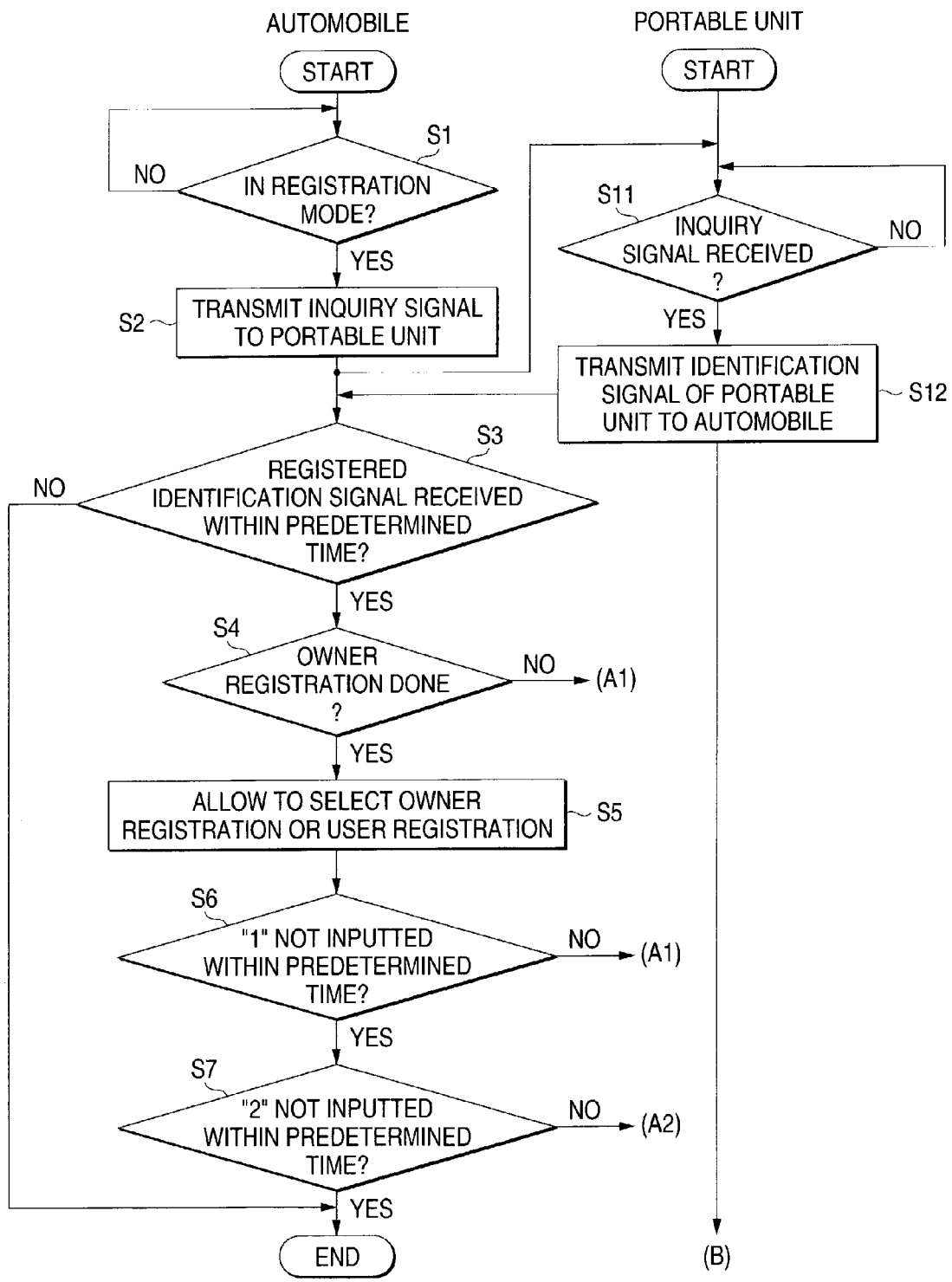
FIGS. 5a–5c are flowcharts explaining a biometrics information registering process.
Figure 6:
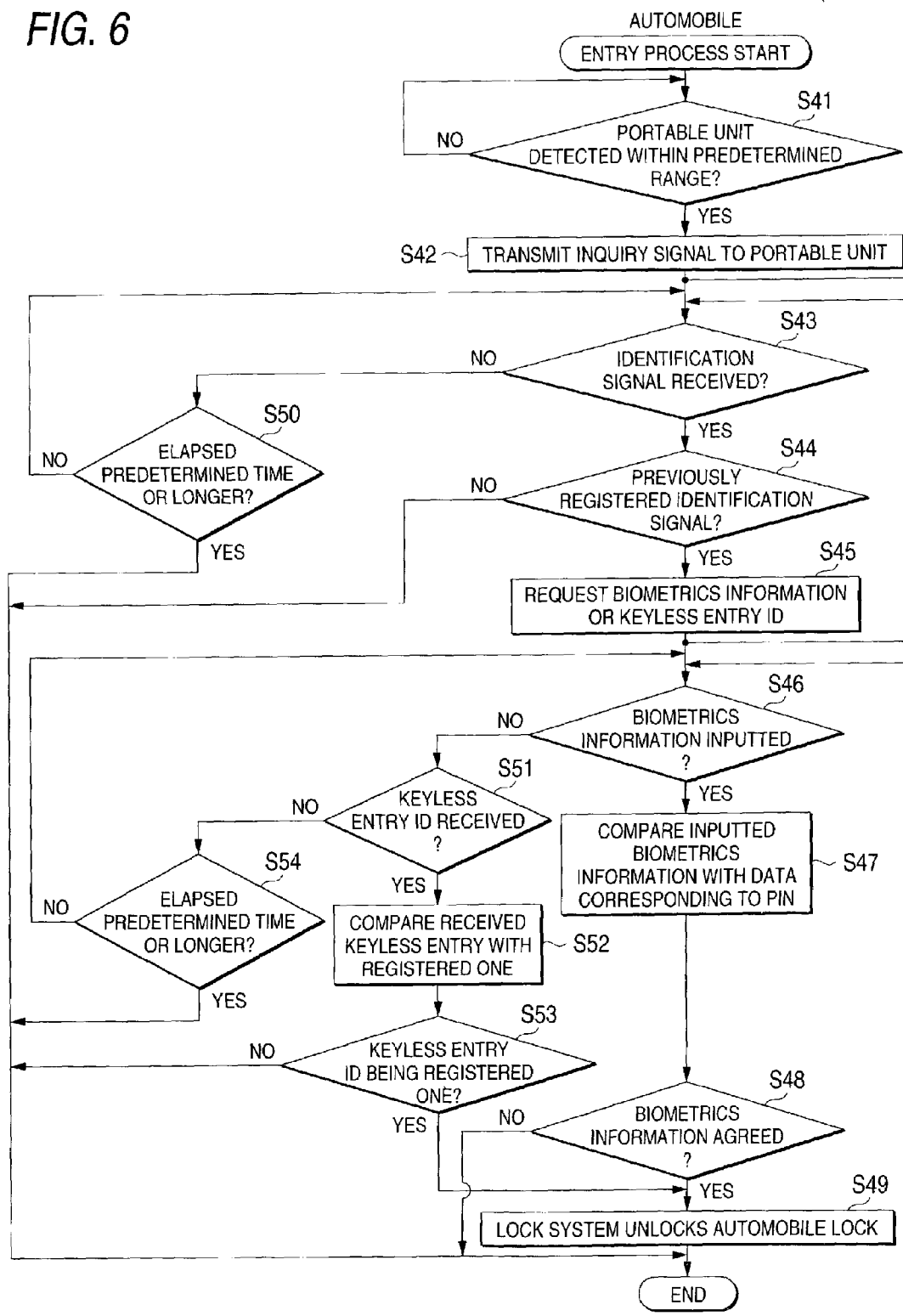
FIG. 6 is a flowchart explaining an entry process.

Explanation will now be made on an entry process to release the door lock of the automobile 1 wherein the user carries the portable unit 2 in a state the biometrics information of FIG. 5 has been completed, with reference to a flowchart of FIG. 6.

In step S41, the control section 11 of the automobile 1 controls the communicating section 15 to determine whether or not the portable unit 2 has been detected within a predetermined range. In the present case, because of an entry process, when the user comes in a range, e.g., of 1 meter of the automobile 1, i.e. the portable unit 2 approaches to a range of within 1 meter of the automobile 1, the communicating section 15 assumably detects the portable unit 2. The control section 11 controls the communicating section 15 in a similar way until detecting that the user carrying the portable unit 2 has approached to a distance of within 1 meter from the automobile 1. For example, when detecting an approach to a distance of within 1 meter, the process proceeds to step S42. Note that the range the automobile 1 is to detect the portable unit 2 may not be 1 meter, i.e. it may be a distance of about 2 to 5 meters, usually, to detect an access of a person walking to an automobile and secure a time for unlocking.

In step S42, the passive entry authenticating section 13 controls the communicating section 15 to transmit an inquiry signal for passive entry authentication to the portable unit 2.

In step S71, the control section 31 of the portable unit 2 controls the communicating section to determine whether an inquiry signal has been received or not. The process is repeated until an inquiry signal has been received. For example, in the case of determining a reception of an inquiry signal by the process of step S42, the process proceeds to step S72.

In step S72, the control section 31 reads an identification signal 33a and PIN 33b out of the memory 33, and controls the communicating section 32 to transmit it to the automobile 1. Incidentally, when sending a PIN 33b, an owner PIN and a user PIN are both transmitted, it is possible to provide a devising to send selectively one of them. Specifically, it is possible to consider the setting to send only an owner PIN if pressing the keyless entry button 121 on the portable unit 2 twice successively and to send only a user PIN if pressing it thrice successively.

In step S43, the control section 11 controls the communicating section 15 to determine whether an identification signal and PIN is received from the portable unit 2 or not. For example, when it is determined by the process of step 72 that an identification signal 33a and PIN 33b is received, the process proceeds to step S44.

In step S44, the passive entry authenticating section 13 determines whether the received identification signal 33a is an identification signal 14a previously stored in the storage section 14 or not. For example, when the received identification signal 33a is (the same as) a previously registered identification signal 14a, the process proceeds to step S45.

In step S45, the control section 11 controls the sensor 101 to request biometrics information input or a keyless entry ID. Namely, substantially biometrics information is requested to a user who has registered biometrics information while pressing the keyless entry button 121 for a user who has not registered biometrics information.

In step S46, the control section 11 controls the sensor 101 to determine whether biometrics information has been inputted or not. For example, in the case that the user carrying the portable unit 2 has inputted biometrics information, the process proceeds to step S47.

In step S47, the biometric authenticating section 103 compares the digitized biometrics information inputted to the sensor 101 with the biometrics information corresponding to the PIN previously registered in the biometrics database 104.

In step S48, the biometrics authenticating section 103 determines whether a comparison result is in agreement or not, to output a determination result to the control section 11. For example, in the case of a determination that the comparison result is in agreement, the process proceeds to step S49 where the control section 11 controls the lock system 12 to unlock the door lock.

In the above process, because in step S46 biometrics information is inputted and the keyless entry button 121 is not pressed, it is determined in step S73 that the keyless entry button 121 is not pressed. Thus, the process of step S74 is skipped to end the process.

In the case of a determination in step S43 that an identification signal 33a and PIN 33b has not been received, the control section 11 in step S50 determines whether a predetermined time or longer has elapsed or not. When a predetermined time or longer has not been elapsed, the process returns to step S43. When a lapse of a predetermined time or longer is determined, the process is ended. Namely, from the fact that an identification signal and PIN has not been received, the detection of within a predetermined range nearby the automobile 1 is not an authorized portable unit 2, thus ending the process.

In step S44, when the identification signal 33a sent from the portable unit 2 is not a previously registered identification signal 14a, the same portable unit 2 is not a portable unit 2 possessed by an authorized user, thus ending the process.

In the case of a determination in step S46 that biometrics information has not been inputted, determination is made in step S51 whether a keyless entry ID has been received or not. For example, in case the keyless entry button 121 of the portable unit 2 is pressed to determine in step S73 that the keyless entry button 121 of the portable unit 2 has been pressed, the control section 31 in step S74 controls the communicating section 32 to read a keyless entry ID 33c out of the memory 33 and send it to the automobile 1. Because at this time the automobile 1 receives the keyless entry ID 33c, in step S51 it is determined that the keyless entry ID 33c has been received. Thereupon, in step S52 the control section 11 controls the lock system 12 to compare between the received keyless entry ID 33c and the keyless entry ID 105a stored in the storage section 105, to determine in step S53 whether the received keyless entry ID 33c agrees with the previously stored keyless entry ID 105a. In step S53, in the case of a determination of agreement between the both of the keyless entry ID 105a and the keyless entry ID 33a, the control section 11 determines that the portable unit 2 carried by the user is that possessed by an authorized user. Thus, the process proceeds to step S49.

In the case of a determination, in step S53, of a non-agreement between both the keyless entry ID 105a and the keyless entry ID 33a, the portable unit 2 has not been legitimately registered and considered not the one possessed by an authorized user, thus ending the process. Namely, the door lock is not released.

When it is determined in step S48 that the input biometrics information is not the one previously registered in the biometrics database 104, the user is considered as not an authorized user, ending the process.

In the case it is determined in step S51 that a keyless entry ID has not been received, then determination is made in step S54 on whether a predetermined time or longer has elapsed or not. When determined that a predetermined time or longer has not elapsed, the process returns to step S46 to repeat the process of steps S46, S51 and S54 until elapsing a predetermined time. In the case it is determined in step S54 that a predetermined time or longer has elapsed, the user is considered not having an intention to input biometrics information nor press the keyless entry button 121, thus ending the process.

As described above, the lock system 12 unlocks the door lock of the automobile 1 on the basis of the identification signal for identifying the portable unit 2 possessed by the user and the biometrics information of the user. Accordingly, it is impossible to wrongfully unlock the door lock even by the use of such a scheme as the above-noted relay team attack. Moreover, the authorized user is allowed to unlock the door lock by a mere input operation with simple biometrics information.

Furthermore, in case the engine immobilizer 106 controls the engine lock by the similar way, the automobile 1 can be prevented more positively from theft by an unauthorized user.

Figure 7:
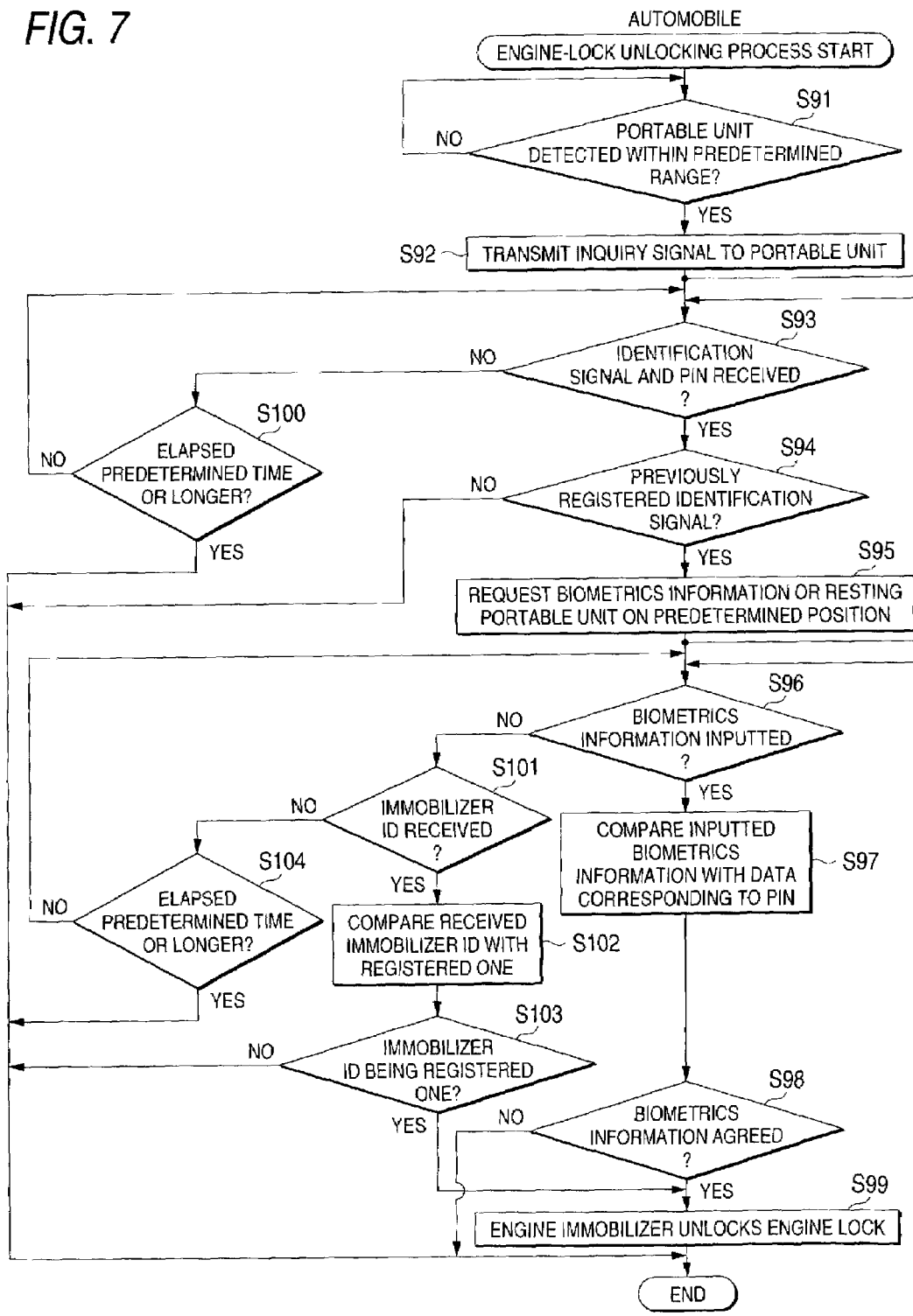
FIG. 7 is a flowchart explaining an engine-lock unlocking process.

Herein, explanation will be made on a process to unlock the engine lock of the engine immobilizer 106, with reference to a flowchart of FIG. 7.

In step S91, the control section 11 of the automobile 1 controls the communicating section 15 to determine whether the portable unit 2 has been detected within a predetermined range or not. Because the present case is on a process to unlock the engine lock of the engine immobilizer, it is premised that the user is driving in a compartment of the automobile 1. Furthermore, he or she is usually seated on or around the driver's seat. Accordingly, for example, in the case that the portable unit 2 enters in a range of within 50 cm with respect to the steering in the compartment, i.e. when the portable unit 2 nears a range of within 50 cm with respect to the steering, the communicating section 15 assumably detects the portable unit 2. The control section 11 controls the communicating section 15 in a similar way until the user carrying the portable unit 2 nears a range of within 50 cm from the steering of the automobile 1. For example, when detecting a nearing to a point of within 50 cm from the steering, the process proceeds to step S92. Note that the range the automobile 1 is to detect the portable unit 2 may not be within 50 cm from the steering but may be a distance where to recognize the user has been aboard the automobile.

In step S92, the passive entry authenticating section 13 controls the communicating section 15 to transmit an inquiry signal for passive entry authentication to the portable unit 2.

In step S121, the control section 31 of the portable unit 2 controls the communicating section to determine whether an inquiry signal has been received or not. The process is repeated until an inquiry signal has been received. For example, in the case the process of step S92 determines a reception of an inquiry signal, the process proceeds to step S122.

In step S122, the control section 31 reads an identification signal 33a and PIN 33b out of the memory 33 and controls the communicating section 32 to transmit it to the automobile 1. Note that, when sending a PIN 33b, an owner PIN and a user PIN are both transmitted, it is possible to send selectively one of the PINs by a scheme as explained in the step S72 of FIG. 6.

In step S93, the control section 11 controls the communicating section 15 to determine whether an identification signal and PIN is received from the portable unit 2 or not. For example, when it is determined by the process of the step S122 that an identification signal 33a and PIN 33b has been received, the process proceeds to step S94.

In step S94, the passive entry authenticating section 13 determines whether the received identification signal 33a is an identification signal 14a previously stored in the storage section 14 or not. For example, when it is determined that the received identification signal 33a is (the same as) a previously stored identification signal 14a, the process proceeds to step S95.

In the step S95, the control section 11 controls the sensor 101 to request a biometrics-information input or resting the portable unit 2 on a predetermined position. Namely, biometrics information is requested to a user who has registered biometrics information whereas resting the portable unit 2 on a predetermined position is requested to a user who has not registered biometrics information.

In step S96, the control section 11 controls the sensor 101 to determine whether biometrics information has been inputted or not. For example, in the case that the user carrying the portable unit 2 inputs biometrics information, the process proceeds to step S97.

In step S97, the biometrics authenticating section 103 compares between the digitized biometrics information inputted to the sensor 101 and the biometrics information that an encrypted PIN is decoded and previously registered in a biometrics database 104 corresponding to that PIN.

In step S98, the biometrics authenticating section 103 determines whether a comparison result is in agreement or not, to output a determination result to the control section 11. For example, when the comparison result is in agreement, the process proceeds to step S99 where the control section 11 controls the engine immobilizer 106 to unlock the engine lock.

In the above process, because the step S96 results in biometrics information not being inputted or the portable unit 2 not being rested in a predetermined position, it is determined in step S123 that the portable unit 2 is not rested in a predetermined position. The process of step S124 is skipped and the process is ended.

In step S93, in the case of a determination that an identification signal 33a and PIN 33b has not been received, the control section 11 in step S100 determines whether a predetermined time or longer has elapsed or not. When determining a predetermined time or longer has not elapsed, the process returns to the step S93 while when determining a predetermined time or longer has elapsed, the process is ended. Namely, from the fact that an identification signal and PIN has not been received, the detection of an authorized portable unit 2 within a predetermined range at or around the automobile 1 has not occurred, thereby ending the process.

In step S94, when the identification signal 33a sent from the portable unit 2 is not a previously registered identification signal 14a, it is considered as not being the portable unit 2 possessed by an authorized user thus ending the process.

In step S96, in the case of a determination that biometrics information has not been inputted, it is determined in step S101 whether an immobilizer ID has been received or not. For example, in the case that the portable unit 2 is rested on a predetermined position to determine, in step S123, the portable unit 2 has been rested in a predetermined position, the control section 31 in step S124 controls the communicating section 32 to transmit the immobilizer ID 33d read out of the memory 33 to the automobile 1. Whether the portable unit 2 has rested on a predetermined position or not, may be by a configuration having an exclusive tray provided in a same form as the portable unit 2 to mechanically or electrically detect a resting of the portable unit 2 on the tray.

At this time, because an immobilizer ID 33d is received through the communicating section 15, determination is made in step S101 that an immobilizer ID 33d has been received. Furthermore, in step S102, the lock system 12 compares between the received immobilizer ID 33d and the immobilizer ID 107a stored in the storage section 107. In step S103, determination is made whether the received immobilizer ID 33d agrees with the previously stored immobilizer ID 107a or not. In step S103, when determining an agreement between the both of the immobilizer ID 105a and the immobilizer ID 33a, the control section 11 determines that the portable unit 2 carried by the user is the one possessed by an authorized user. The process proceeds to step S99.

In the case of a determination of non-agreement between the both of the immobilizer ID 107a and the immobilizer ID 33a in the step S103, the portable unit 2 is not the legitimately registered one and hence the user carrying it is considered as not an authorized user, thus ending the process. Namely, the engine lock is not to be released.

In step S98, in the case that the input biometrics information is determined as not the one previously registered in the biometrics database 104, the user is considered as not an authorized user, thus ending the process.

In step S101, in the case of a determination that an immobilizer ID has not been received, it is determined in step S104 whether a predetermined time or longer has elapsed or not. When it is determined that a predetermined time or longer has not elapsed, the process returns to step S96 to repeat the process of steps S96, S101 and S104 until the predetermined time has elapsed. When it is determined that the predetermined time has elapsed in the step S104, the user is considered not having an intention to input biometrics information nor to rest the portable unit 2 on a predetermined position, thus ending the process.

As described above, the lock system 12 unlocks the engine lock of the automobile 1 on the basis of an identification signal for identifying the portable unit 2 carried by the user and the biometrics information of the user. Should the door lock be wrongfully unlocked, the engine lock cannot be structurally unlocked. Moreover, the authorized user is allowed to unlock the door lock and engine lock by a simple operation.

According to the above, wrongful authentication can be positively prevented by combining an authentication process to be made between the apparatuses used in authentication (automobile 1 and portable unit 2, in the above embodiment) with an authentication process with the biometrics information on an authorized user.

Incidentally, the embodiment so far introduced mainly sets forth an example capable of registering only an owner PIN on one person and user PIN on one person. However, by increasing the capacity of the memory 33 within the portable unit 2, a plurality of user PINs can be registered. Also, the biometrics database 104 in the automobile 1 can store user PINs and biometrics information (fingerprints, etc.) in the number of persons to be registered on the portable unit. Furthermore, because the number of portable units 2 usable on one automobile 1 can be increased as required, the biometrics database 104 may store therein the combinations of a multiplicity of user PINs and pieces of biometrics information. In this case, in case devising is made to send only a particular owner PIN and user PIN to the automobile 1 by properly operating the keyless entry button 121 of the portable unit 2, the time required for authentication (particularly, biometrics information matching) can be shortened by invoking from the biometrics database 104 only the biometrics information corresponding to the PIN transmitted from the portable unit 2 during an authentication of an owner or user.

Besides, it is possible to consider an embodiment that the sensor section 101 has fingerprint-reading and biometrics-detecting functions so that owner or user authentication can be suspended in case the finger placed in the sensor section 101 is an "imitation made of rubber or the like".

Furthermore, although there is available, in many hotels, service what is called "valley parking" that an employee drives a car to store it in a predetermined parking lot, the hotel employee who has not registered the fingerprint is not allowed to drive the car mounted with the invention. In this respect, the following measure, for example, can be taken to temporarily allow the employee to drive the car.

First, a predetermined numeral ("5963" or the like) is inputted through the ten key 102b in a state the mode change switch 102a is in an operation mode, and then the fingerprint of a owner or user is read out by the sensor section 101. This provides an authorization to the hotel employee to drive the car for only a constant time period (e.g. 15 minutes) so that he or she can store the car in a parking lot in a constant time. Elapsing the constant time, the lock system 12 of within the automobile 1 operates to lock the automobile door.

Although the embodiment so far used the fingerprint as biometrics information, it is possible to use biometrics information of other than the fingerprint. In such a case, where biometrics information employs the image data taken a picture of part or all of a human body, such as facial front, retina pattern or physiognomy, a camera capable of taking a picture of a still or moving image is used in the sensor section 101. Meanwhile, in the case of adopting voiceprints as biometrics information, the sensor section 101 uses a microphone.

The series of processes described in the above, although to be executed by hardware, can be executed by software. In the case the series of processes are to be executed by software, a program configuring the software is installed from a recording medium onto a computer built with an exclusive hardware or, for example, onto a general-purpose personal computer capable of executing various functions by installing various programs.

FIGS. 8 and 9 show a configuration of an embodiment of a personal computer in the case the control section of the automobile 1 and the portable unit 2 are realized by software. The CPU 501, 601 of the personal computer controls the overall operation of the personal computer. Also, the CUP 501, 601, when inputted by an instruction from the user through an input section 506, 606 formed by a keyboard or mouse via a bus 504, 604 and an input/output interface 505, 605, correspondingly executes the program recorded on a ROM (Read Only Memory) 502, 602. Otherwise, the CPU 501, 601 executes the program read out of a magnetic disk 511, 611, optical disk 512, 612, magneto-optical disk 513, 613 or semiconductor memory 514, 614 connected to a drive 510, 610 and installed on a storage section 508, 608, by being loaded onto a RAM (Random Access Memory) 503, 603. This realizes the functions of the control section of the automobile 1 and the portable unit 2 by software. Furthermore, the CPU 501, 601 controls the communicating section 509, 609 to communicate with the outside, thus executing data transmission and reception.

The recording medium recording a program, as shown in FIGS. 8 and 9, separately from a computer, is to be configured by a package media of a magnetic disk 511, 611 (including a flexible disk), an optical disk 512, 612 (including CD-ROM (Compact Disk-Read Only Memory), a DVD (Digital Versatile Disk)), a magneto-optical disk 513, 613 (including MD (Mini-Disk)) or a semiconductor memory 514, 614 recording a program to be distributed to the users. Besides, the recording medium is to be configured by a ROM 502, 602 recording a program or a hard disk included in a storage section 508, 608, to be provided to the users in a state previously incorporated in a computer.

Incidentally, in the present description, the processes, to be executed chronologically in the sequence described in the steps describing the program recorded on the recording medium, are not necessarily processed in a chronological order, of course including the processes to be executed in a parallel or individual fashion.

Meanwhile, in the present description, the system represents an apparatus overall configured with a plurality of apparatuses.

What is claimed is:

1. An authenticating apparatus comprising:
   a receiving section for receiving an identification signal of a portable unit transmitted from the portable unit through radio communication;
   an identification signal storing section for storing one or more of previously registered identification signals of portable units;
   a sensor section for requesting biometrics information or a identification signal, wherein the sensor section requests biometric information if a person has registered biometrics information and requests an identification signal if a person has not registered biometrics information;
   portable-unit authenticating section for comparing a received identification signal with a stored identification signal to confirm whether the both identification signals are in agreement or not;
   an information input section for inputting biometrics information;
   an information storing section for storing biometrics information on one or more of previously registered persons;
   a person authenticating section for comparing input biometrics information with stored biometrics information to confirm whether the both pieces of biometrics information are in agreement or not;
   a determining section for determining whether authentication results of the portable-unit authenticating section and the person authenticating section are respectively authentication results in agreement or not;
   wherein the information storing section stores the biometrics information of the previously registered person and a unique person identification number corresponding to the biometrics information, the portable unit storing the unique person identification number together with the identification signal, the receiving section receiving the unique person identification number together with the identification signal through radio communication from the portable unit, the person authenticating section invoking, from the information storing section, biometrics information corresponding to the unique person identification number received by the receiving section to compare invoked biometrics information with the inputted biometrics information thereby carrying out personal authentication; and
   wherein the personal identification number is classified with a first-kind personal identification number representing an owner of the authenticating apparatus or an appliance incorporating the authenticating apparatus and a second personal identification number representing a user other than the owner, further comprising a registration control section for controlling the information input section and the information storing section in order to register the biometrics information and the personal identification number, the registration control section confirming a previous registration of the first-kind personal identification number and the biometrics information with correspondence and a previous input of the biometrics information corresponding to the first-kind personal identification number from the information input section, to thereafter carry out control for registering the second-kind personal identification number and the biometrics information with correspondence.

2. An authenticating apparatus according to claim 1, wherein the registration control section, when the first-kind personal identification number and the biometrics information have been registered with correspondence, carries out control to delete all of the already stored second-kind personal identification numbers and the biometrics information corresponding thereto from the information storing section.

3. A method of registering a person to an authenticating apparatus or an appliance using an authenticating method comprising the steps of:
   receiving an identification signal of a portable unit transmitted from the portable unit through radio communication;
   comparing a received identification signal with a previously registered identification signal to confirm whether both identification signals are in agreement or not thereby carrying out authentication of the portable unit;

accepting an input of biometrics information if a person has registered biometrics information or accepting an input of a portable unit ID if a person has not registered biometrics information;

if a portable unit ID is accepted, comparing the inputted portable unit ID with a previously registered portable unit ID and determining whether the inputted portable unit ID is the previously registered ID;

if biometrics information is accepted, comparing inputted biometrics information with previously registered biometrics information to confirm whether the both pieces of biometrics information are in agreement or not thereby carrying out authentication of a person; and determining whether an authentication result of the portable unit and an authentication result of the person are, both, in agreement or not;

wherein the previously registered biometrics information is stored together with a unique personal identification number corresponding to the biometrics information, the identification signal and unique personal identification number stored within the portable unit being received through radio communication from the portable unit on the other hand, biometric information corresponding to the unique personal identification number obtained by the reception being invoked in the personal authentication and compared with the inputted biometrics information thereby carrying out personal authentication; and wherein the personal identification number is classified with a first-kind personal identification number representing an owner of the authenticating apparatus or appliance and a second-kind personal identification number representing a user other than the owner, a previous registration of the first-kind personal identification number and the biometrics information with correspondence and a previous input of the biometrics information corresponding to the first-kind personal identification number being confirmed to thereafter register the second-kind personal identification number and the biometrics information with correspondence.

4. A method of registering a person according to claim 3, wherein, when the first-kind personal identification number and the biometrics information are registered with correspondence, the already stored second-kind personal identification numbers and the biometrics information corresponding thereto are all deleted.

5. An authenticating apparatus comprising:

a receiving section for receiving an identification signal of a portable unit transmitted from the portable unit through radio communication;

an identification signal storing section for storing one or more of previously registered identification signals of portable units;

portable-unit authenticating section for comparing a received identification signal with a stored identification signal to confirm whether the both identification signals are in agreement or not;

an information input section for inputting biometrics information;

an information storing section for storing biometrics information on one or more of previously registered persons and a unique person identification number corresponding to the biometrics information;

a communicating section for transmitting the unique person identification number from the information storing section;

a person authenticating section for comparing input biometrics information with stored biometrics information to confirm whether the both pieces of biometrics information are in agreement or not; and a determining section for determining whether authentication results of the portable-unit authenticating section and the person authenticating section are respectively authentication results in agreement or not;

wherein the information storing section stores the biometrics information of the previously registered person and the unique person identification number corresponding to the biometrics information, the portable unit storing the unique person identification number which is transmitted by the communicating section together with the identification signal, the receiving section receiving the unique person identification number together with the identification signal through radio communication from the portable unit, the person authenticating section invoking, from the information storing section, biometrics information corresponding to the unique person identification number received by the receiving section to compare invoked biometrics information with the inputted biometrics information thereby carrying out personal authentication.

* * * * *